(12) United States Patent
Totsuka et al.

(10) Patent No.: US 7,213,835 B2
(45) Date of Patent: May 8, 2007

(54) OCCUPANT RESTRAINT SYSTEM

(75) Inventors: Hirofumi Totsuka, Wako (JP); Takashi Aoki, Wako (JP); Hidetoshi Utsumi, Wako (JP); Naoki Takemura, Wako (JP); Yuichi Saito, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 352 days.

(21) Appl. No.: 10/742,638

(22) Filed: Dec. 19, 2003

(65) Prior Publication Data

US 2004/0150198 A1 Aug. 5, 2004

(30) Foreign Application Priority Data

Dec. 20, 2002 (JP) ............................ P.2002-370261

(51) Int. Cl.
*B60R 21/20* (2006.01)
(52) U.S. Cl. .............................. 280/730.2; 280/728.2; 280/743.1
(58) Field of Classification Search ............. 280/730.2, 280/728.2, 728.1, 743.1
See application file for complete search history.

(56) References Cited

U.S. PATENT DOCUMENTS

| 6,460,879 | B2 * | 10/2002 | Tanase et al. ............ 280/730.2 |
| 6,530,594 | B1 * | 3/2003 | Nakajima et al. ......... 280/730.2 |
| 6,786,506 | B2 * | 9/2004 | Yasuhara et al. ......... 280/730.2 |
| 6,974,152 | B2 * | 12/2005 | Hanjono ................... 280/728.3 |
| 2001/0006287 | A1 * | 7/2001 | Tanase et al. ............ 280/730.2 |

FOREIGN PATENT DOCUMENTS

| JP | 09-315253 | 12/1997 |
| JP | 11-321521 | 11/1999 |
| JP | 2000-198407 | 7/2000 |
| JP | 2000-272462 | 10/2000 |
| JP | 2001-114054 | 4/2001 |
| JP | 2001-246989 | 9/2001 |

\* cited by examiner

*Primary Examiner*—Paul N. Dickson
*Assistant Examiner*—Drew J. Brown
(74) *Attorney, Agent, or Firm*—Carrier, Blackman & Associates, P.C.; Joseph P. Carrier; William D. Blackman

(57) ABSTRACT

An occupant restraint system in which an air bag is inflated with a gas generated by an inflator so as to be deployed along an inner surface of a side portion of a passenger compartment in a curtain-like fashion when a vehicle is involved in a collision, wherein a portion of the air bag in a folded state which is located in the vicinity of an end portion thereof is disposed within a space between a pillar and a pillar garnish mounted on a side of the pillar which faces a passenger compartment. By accommodating the air bag within an air bag accommodation chamber formed by partitioning the space with a bulkhead formed integrally on the pillar garnish, the bulkhead is allowed to be interposed between other members residing within the pillar garnish such as clips and brackets and the air bag.

9 Claims, 8 Drawing Sheets

OCCUPANT RESTRAINT SYSTEM

BACKGROUND OF THE INVENTION

1. Field of the Invention

The present invention relates to an occupant restraint system in which an air bag in a folded state is arranged in such a manner as to extend along a side portion of a roof and a pillar, so that, when a vehicle is involved in a collision, the air bag is inflated with a gas generated by an inflator so as to be deployed in a curtain-like fashion along an inner surface of a side portion of a passenger compartment.

2. Description of the Related Art

The occupant restraint system is known by JP-A-9-315253. A front end portion of the air bag of the occupant restrain system is accommodated in a folded state in a space formed between a front pillar (A pillar) and a pillar garnish fixed to a side of the front pillar which faces the passenger compartment with clips. The air bag inflated when the vehicle is involved in a collision is designed to push open the pillar garnish to be deployed into the passenger compartment.

Incidentally, clips for fixing the pillar garnish to the front pillar and brackets with which the clips are brought into engagement are disposed in the space where the near-front end portion of the air bag of the related-art occupant restraint system is accommodated, that is, the space formed between the front pillar and the pillar garnish. Therefore, there has been a possibility that the air bag which is being inflated is brought into contact with the clips or brackets to be damaged.

SUMMARY OF THE INVENTION

The invention was made in view of these situations, and an object thereof is to provide an occupant restraint system which can prevent a damage to an air bag accommodated in a folded state within a pillar garnish that would occur when the air bag which is being inflated interferes with the other members provided within the pillar garnish.

With a view to attaining the object, according to a first aspect of the invention, there is proposed an occupant restraint system comprising:

an air bag in a folded state being arranged in such a manner as to extend along a side portion of a roof and a pillar, the air bag being inflated with a gas generated by an inflator so as to be deployed in a curtain-like fashion along an inner surface of a side portion of a passenger compartment when a vehicle is involved in a collision; and a pillar garnish mounted on a side of a pillar which faces the passenger compartment, the pillar garnish having a bulkhead for partitioning a space formed between the pillar and the pillar garnish so as to define an air bag accommodation chamber for accommodation of the air bag.

According to the construction, since the space formed between the pillar and the pillar garnish is partitioned by the bulkhead provided on the pillar garnish so as to define the air bag accommodation chamber where the air bag is accommodated, the bulkhead is allowed to be interposed between other members residing within the pillar garnish and the air bag so as to ensure the prevention of a damage to the air bag that would be caused when the air bag which is in the process of inflation interferes with the other members.

Note that a D pillar 17 in embodiments of the invention corresponds to the pillar of the invention.

DETAILED DESCRIPTION OF THE INVENTION

A mode for carrying out the invention will be described below based on embodiments of the invention which are illustrated in the accompanying drawings.

Figure 1:
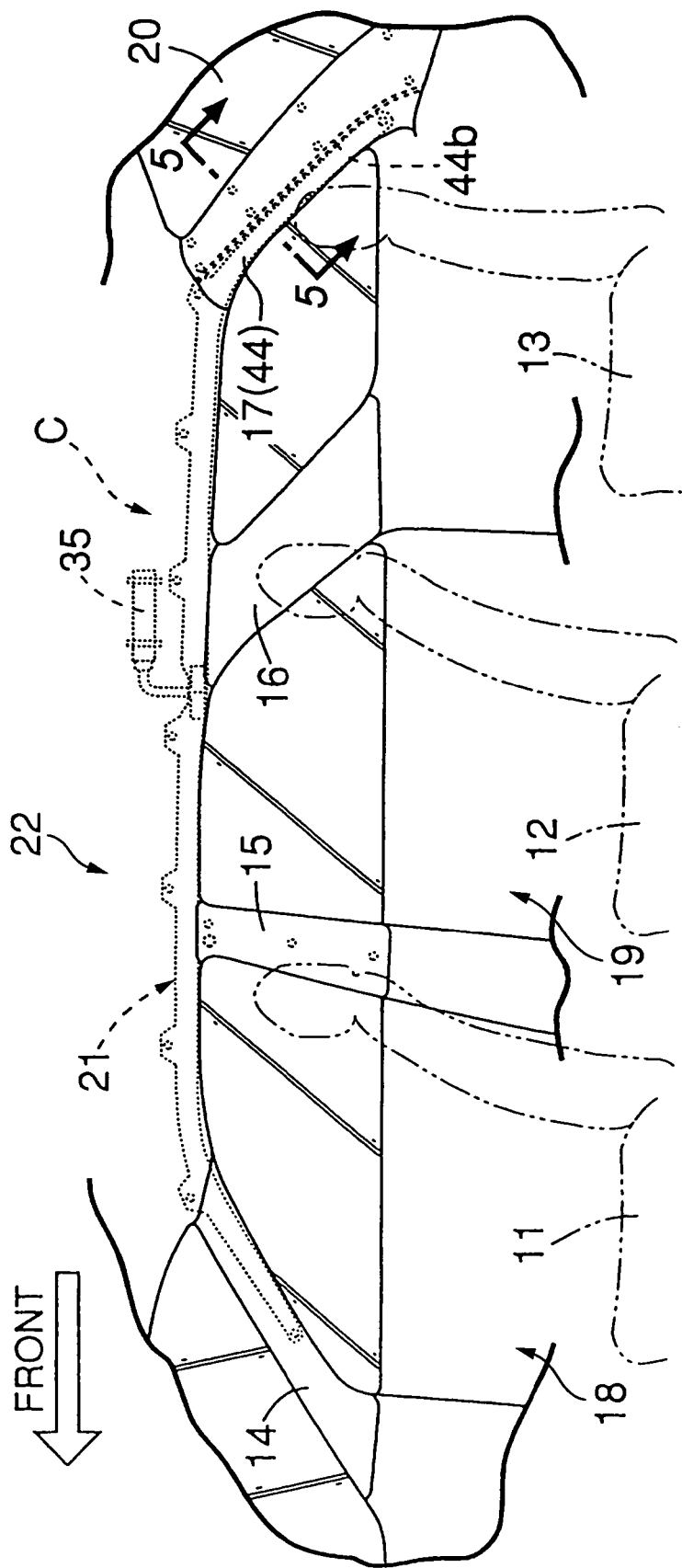
FIG. 1 is a drawing showing an inside of a passenger compartment of a vehicle when an air bag is in a non-deployed state.
Figure 2:
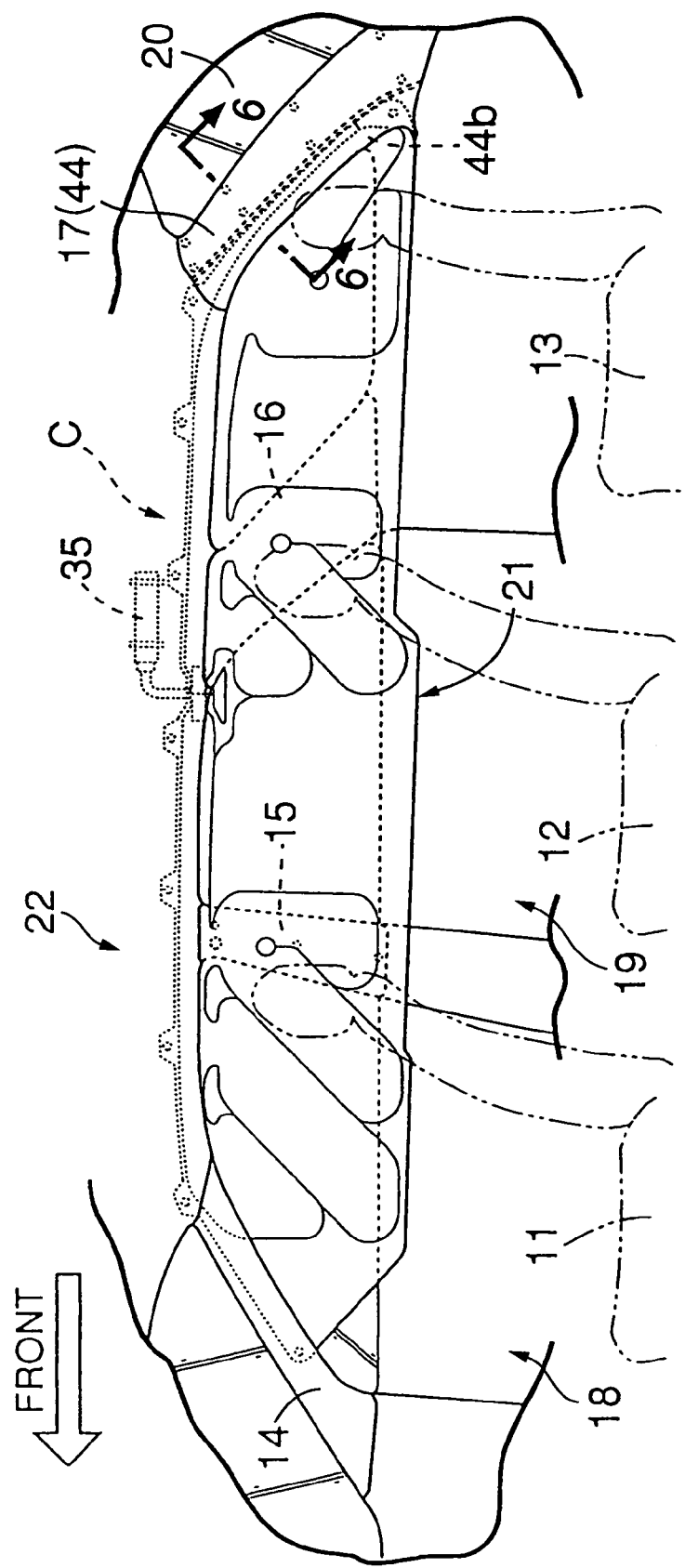
FIG. 2 is a drawing showing the inside of the passenger compartment of the vehicle when the air bag has been deployed.
Figure 3:
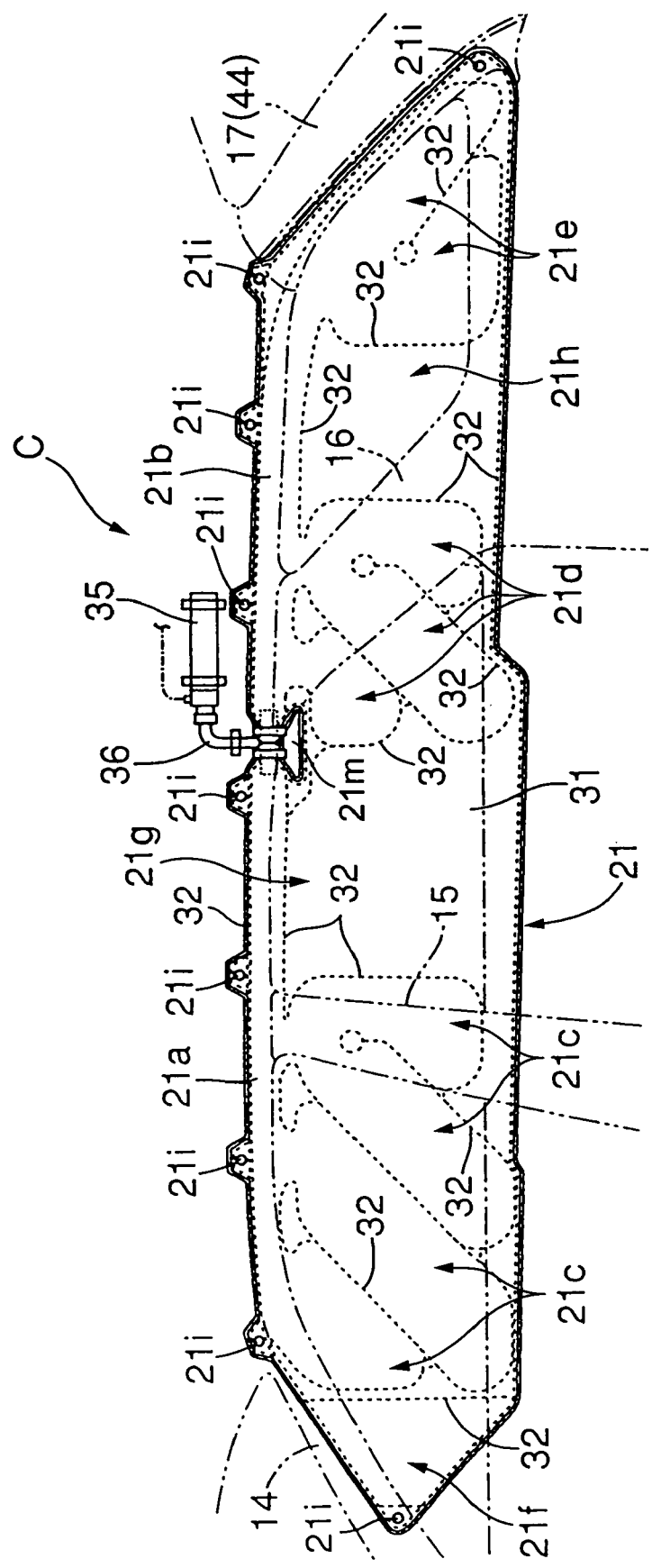
FIG. 3 is an enlarged view of a main part of FIG. 2.
Figure 4:
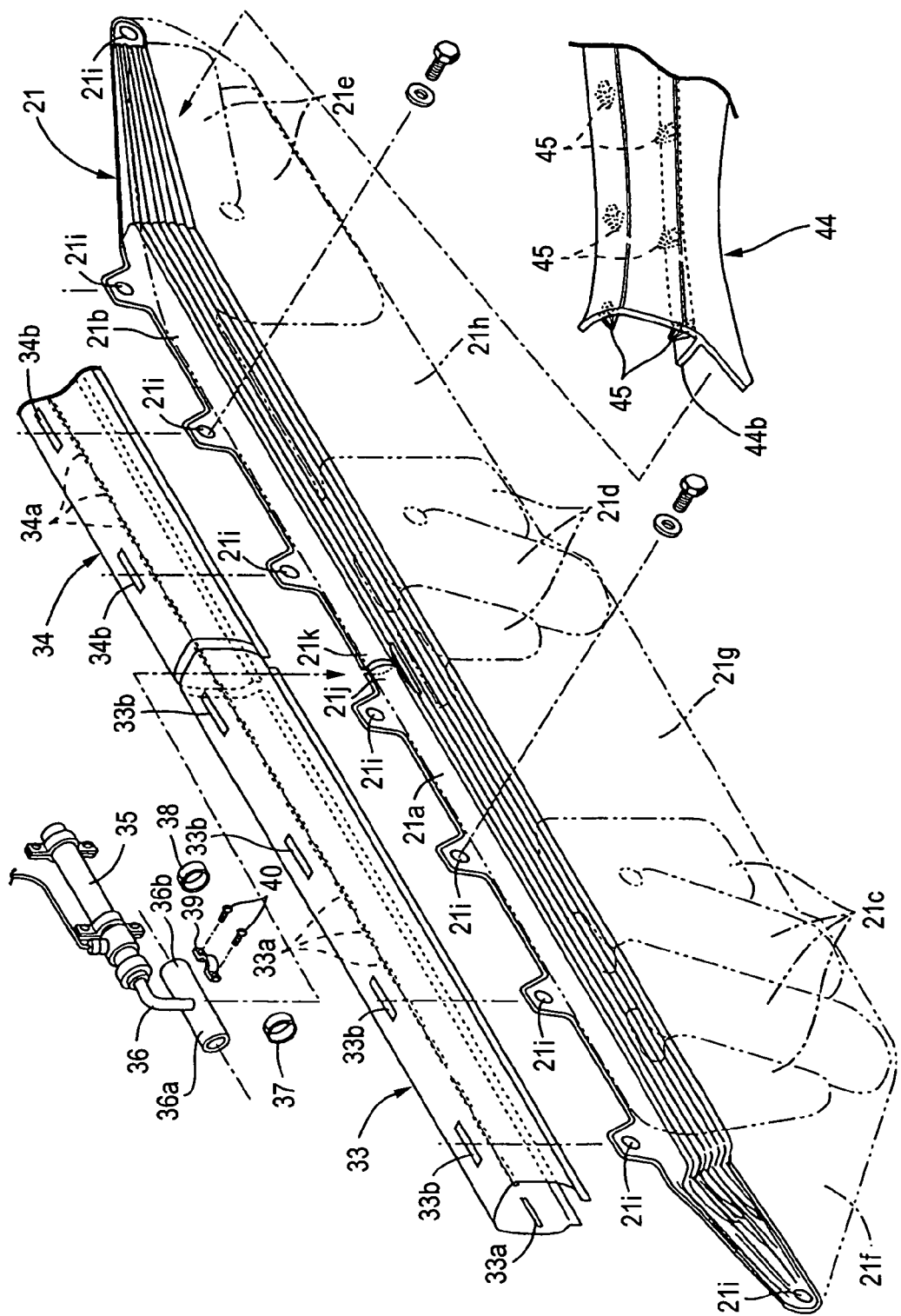
FIG. 4 is an exploded perspective view of an occupant restraint system.
Figure 5:
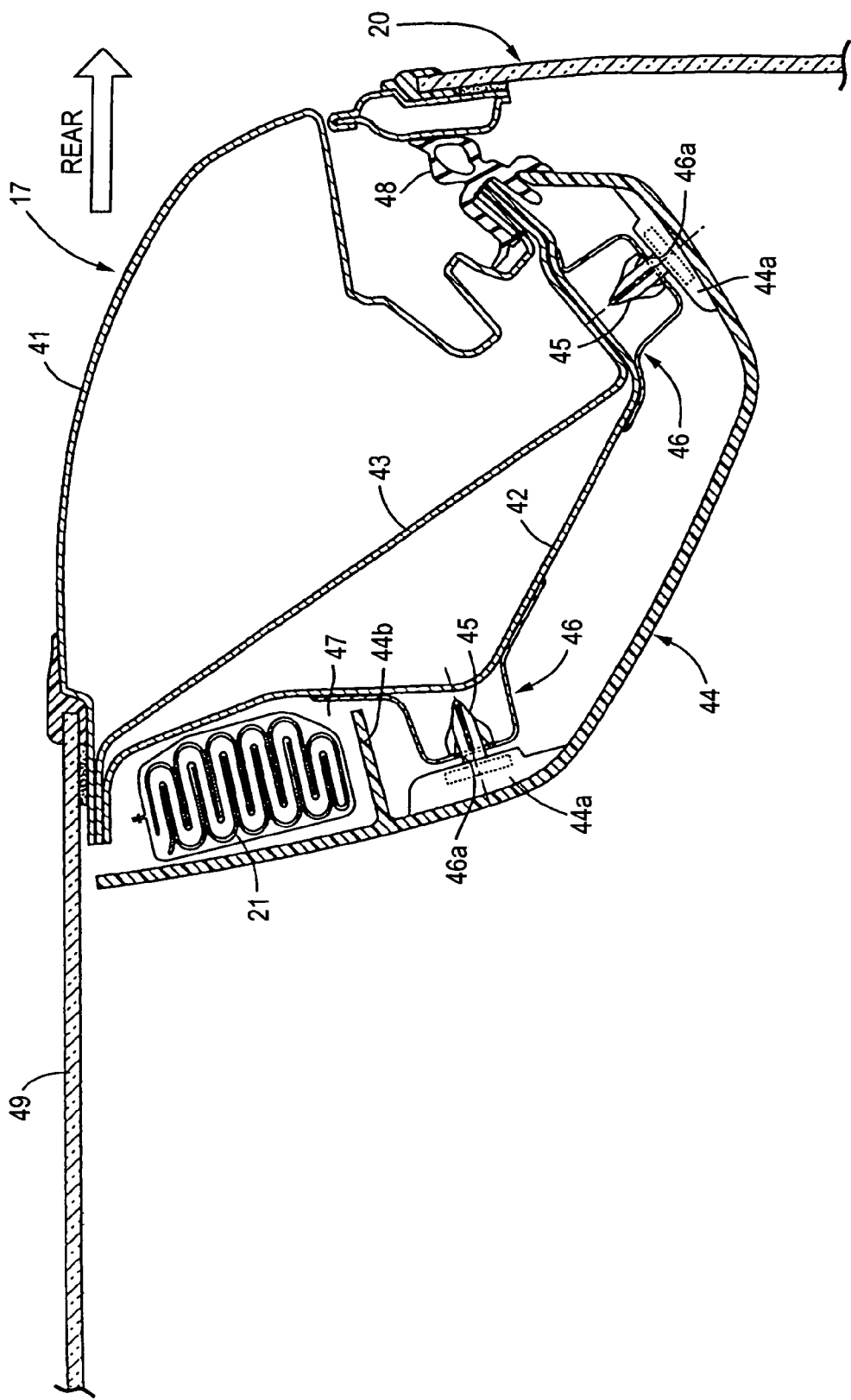
FIG. 5 is an enlarged cross-sectional view taken along the line 5—5 in FIG. 1.
Figure 6:
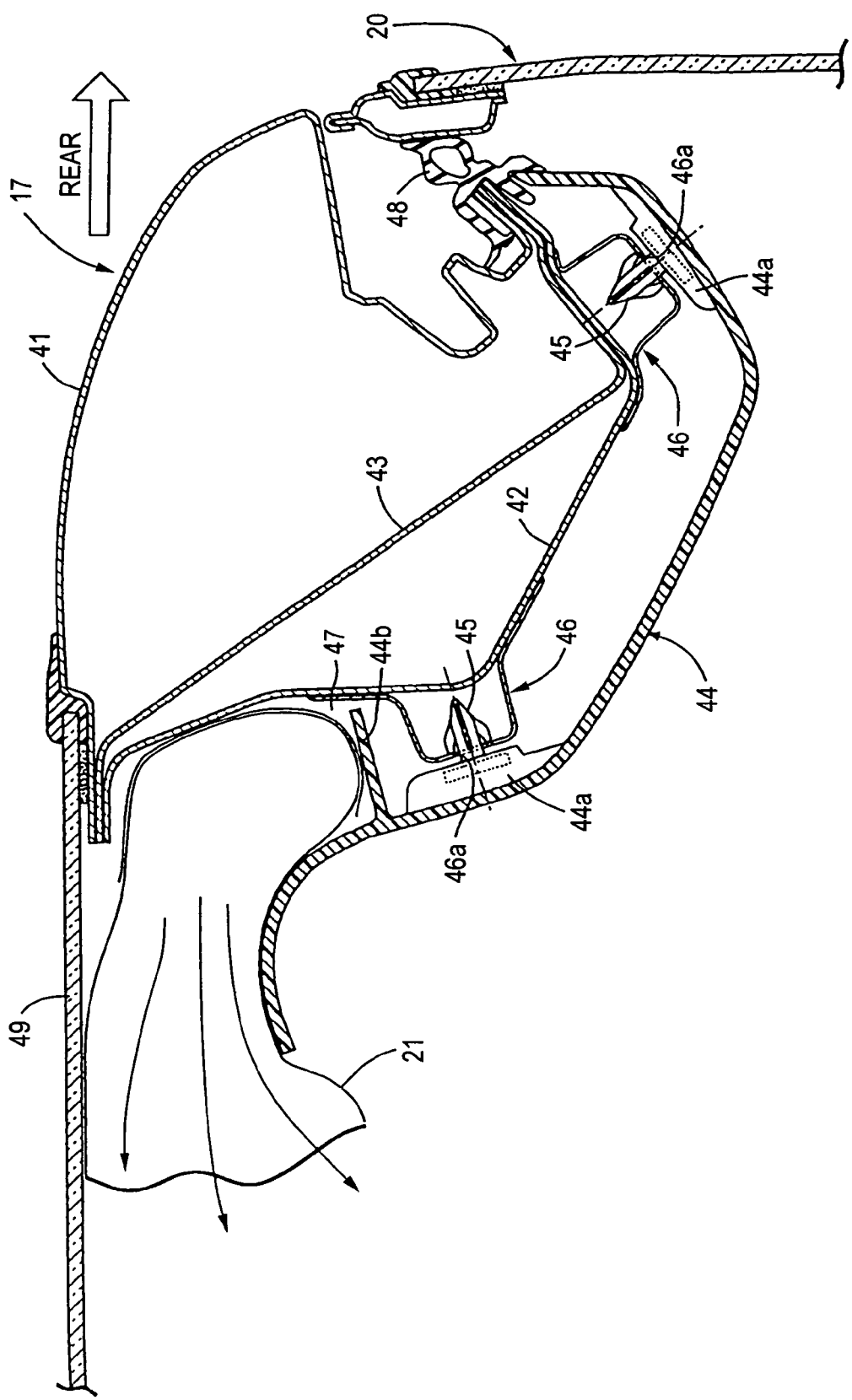
FIG. 6 is an enlarged cross-sectional view taken along the line 6—6 in FIG. 2.

FIGS. 1 to 6 show an embodiment of the invention, in which FIG. 1 is a drawing showing an inside of a passenger compartment of a vehicle when an air bag is in a non-deployed state, FIG. 2 is a drawing showing the inside of the passenger compartment of the vehicle when the air bag has been deployed, FIG. 3 is an enlarged view of a main part of FIG. 2, FIG. 4 is an exploded perspective view of an occupant restraint system, FIG. 5 is an enlarged cross-sectional view taken along the line 5—5 in FIG. 1, and FIG. 6 is an enlarged cross-sectional view taken along the line 6—6 in FIG. 2.

As shown in FIG. 1, a recreational vehicle or RV has a front-row seat 11, a center-row seat 12 and a rear-row seat 13. The RV also has A pillars 14, B pillars 15, C pillars 16 and D pillars 17. A front side door 18 is disposed between the A pillar 14 and the B pillar 15, a rear side door 19 is disposed between the B pillar 15 and the C pillar 16, and a tailgate 20 is disposed rearward of the D pillar 17. An air bag 21, which is folded, of an occupant restraint system C is accommodated so as to extend in a longitudinal direction of a vehicle body along a side portion of a roof 22 defined between the A pillar 14 and the D pillar 17. Note that while occupant restraint systems C having substantially the same construction are provided on both sides of the vehicle body, an occupant restraint system provided on the right-hand side of the vehicle body will be described below as representing the systems so provided.

As is clear from FIGS. 2 to 4, the air bag 21 is constructed by sewing 32 . . . a double-layered fabric base 31 and includes front and rear gas distribution passageways 21a, 21b which extend longitudinally along an upper edge of the air bag 21. The air bag 21 also includes a plurality of cells 21c . . . which are branched to descend from the front gas distribution passageway 21a for protecting the head of an occupant on the front-row seat 11, a plurality of cells 21d . . . which are branched to descend from the rear gas distribution passageway 21b for protecting the head of an occupant on the center-row seat 12 and a plurality of cells 21e . . . which are branched to descend from the rear gas distribution passageway 21b for protecting the head of an occupant on the rear-row seat 13.

A non-deployable portion 21f to which no gas is supplied is formed ahead of the cells 21c . . . for the occupant on the front-row seat 11, a non-deployable portion 21g to which no gas is supplied is formed between the cells 21c . . . for the occupant on the front-row seat 11 and the cells 21d . . . for the occupant on the center-row seat 12, and a non-deployable portion 21h to which no gas is supplied is formed between the cells 21d . . . for the occupant on the center-row seat 12 and the cells 21e . . . for the occupant on the rear-row seat 13. Then, a plurality of attaching portions 21i . . . formed along the upper edge of the air bag 21 are fixed to the roof 22, the A pillar 14 and the D pillar 17.

The folded air bag 21 is encompassed by fabric covers 33, 34 which are divided longitudinally. The respective covers 33, 34 are sewn along lower edges thereof and are then formed into a cylindrical configuration, and the deployment of the air bag 21 is made possible when the covers 33, 34 break at stitch-like breakable portions 33a . . . , 34a . . . which are formed along the lengths of the covers 33, 34. The plurality of attaching portions 21i . . . formed along the upper edge of the air bag 21 are allowed to protrude upwardly through openings 33b . . . , 34b . . . which are formed in upper sides of the covers 33, 34.

As is clear from FIGS. 3 and 4, an inflator 35 is disposed on the side portion of the roof 22 at a position which faces an upper end of the C pillar 16. A gas supply pipe 36 which extends forward from an end portion of the inflator 35 is bent downwardly and is then branched into a longitudinal fork. A gas injection port 36a at a front end of the forked gas supply pipe 36 is inserted into a front gas supply port 21j at a rear end of the front gas distribution passageway 21a and is then fixed in place with a fixing band 37. A gas injection port 36b at a rear end of the forked gas supply pipe 36 is then inserted into a rear gas supply port 21k at a front end of the rear gas distribution passageway 21b and is then fixed in place with a fixing band 38. As this occurs, the fabric base 31 is cut out in a trapezoidal shape to form an opening 21m below the front and rear gas supply ports 21j, 21k in order to avoid interferences with the fixing bands 37, 38. The gas supply pipe 36 is fixed to the vehicle body with a fixing member 39 and bolts 40, 40.

As is clear from FIGS. 4 and 5, the D pillar 17 is constructed to have a closed cross section by welding together three members such as a pillar outer 41, a pillar inner 42 and a stiffener 43, and a side of the pillar inner 42 which faces the passenger compartment is covered with a synthetic resin pillar garnish 44. A plurality of clip mounting seats 44a . . . and a bulkhead 44b which extends longitudinally are formed integrally on an inner surface of the pillar garnish 44. The pillar garnish 44 is fixed to the pillar inner 42 by inserting clips 45 . . . supported in the clip mounting seats 44a . . . into openings 46a in brackets 46 . . . welded to the pillar inner 42 so as to be locked in place therein. Part of a space surrounded by the pillar inner 42 and the pillar garnish 44 is partitioned by the bulkhead 44b so as to define an air bag accommodation chamber 47 where the folded air bag 21 is accommodated.

Note that a side edge of the tailgate 20 abuts with a weatherstrip 48 mounted on a rear portion of the D pillar 17 and that a rear side glass 49 is bonded to a front side of the D pillar 17.

Next, the function of the embodiment of the invention that is constructed as has been described heretofore will be described below.

When a side collision or a roll-over of the vehicle is detected by an acceleration sensor, the inflator 35 is activated by a command from an electronic control unit, and a gas stored under pressure in the inflator 35 is supplied into the longitudinal gas distribution passageways 21a, 21b of the air bag 21 via the gas supply pipe 36 and then flows therefrom into the respective cells 21c . . . , 21d . . . , 21e . . . As a result, the air bag 21 accommodated in the folded state in such a manner as to extend along the side portion of the roof 22 is then inflated, and as shown in FIG. 6, while pushing downwardly a roof garnish by virtue of the pressure thereof, the air bag 21 is deployed downwardly into the passenger compartment through an opening formed. The front-end cells 21c . . . of the air bag 21 so deployed protect the head of the occupant on the front-row seat 11, the central cells 21d . . . protect the head of the occupant on the center-row seat 12, and the rear-end cells 21e . . . protect the head of the occupant on the rear-row seat 13.

As this occurs, a rear part of the air bag 21 accommodated along the D pillar 17 is inflated within the interior of the air bag accommodation chamber 47 partitioned by the bulkhead 44b of the pillar garnish 44 and deploys into the passenger compartment while pushing open an edge portion of the pillar garnish 44 which extends along the rear side glass 49. The interference of the air bag 21 with the clips 45 and the brackets 46 which are provided adjacent thereto is prevented by allowing the air bag 21 to be inflated within the air bag accommodation chamber 47, whereby a risk that the air bag 21 is damaged by the interference thereof with the clips 45 and brackets 46 can be prevented. Moreover, the position of the accommodated air bag becomes stable due to the provision of the air bag accommodation chamber 47, whereby the deployment of the air bag can be ensured.

Figure 7:
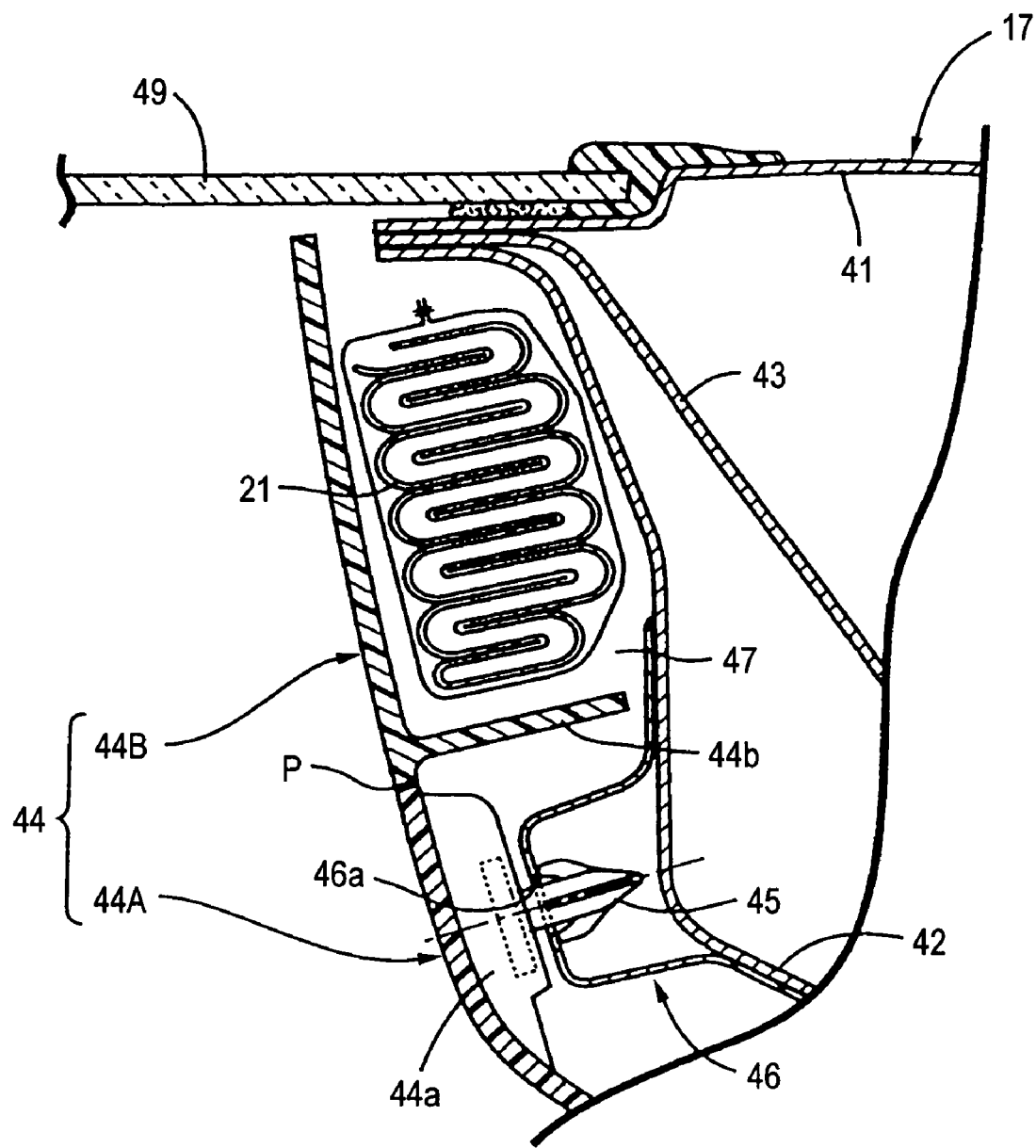
FIG. 7 is a cross-sectional view of a portion of a D pillar which relates to a second embodiment.

Next, a second embodiment of the invention will be described based on FIG. 7

While the pillar garnish 44 of the first embodiment is formed integrally, a pillar garnish 44 of a second embodiment is divided into two portions; a first portion 44A and a second portion 44B by a dividing line P, and a bulkhead 44b is formed integrally on the second portion 44B.

Figure 8:
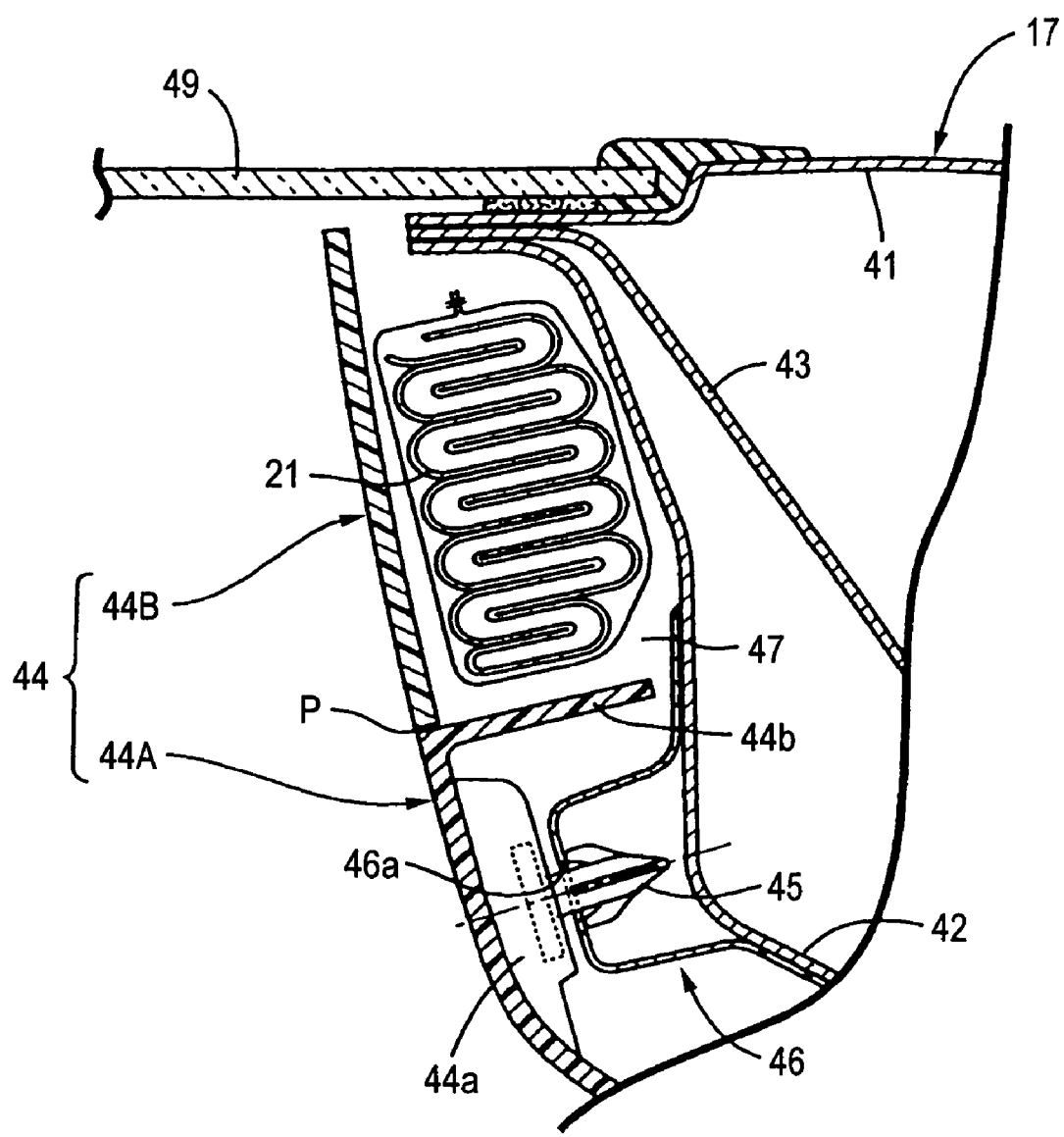
FIG. 8 is a cross-sectional view of a portion of the D pillar which relates to a third embodiment.

Next, a third embodiment of the invention will be described based on FIG. 8.

While the pillar garnish 44 of the first embodiment is formed integrally, a pillar garnish 44 of a third embodiment is divided into two portions; a first portion 44A and a second portion 44B by a dividing line P, and a bulkhead 44b is formed integrally on the first portion 44A.

Thus, functions and advantages similar to those attained by the first embodiment can be attained even by the second and third embodiments, and moreover, since the second portion 44B is allowed to separate from the first portion 44A easily when the air bag 21 is inflated, the formation of an opening from which the air bag is deployed can be ensured.

Thus, while the embodiments of the invention have been described in detail heretofore, the invention can be modified variously with respect to the design thereof without departing from the spirit and scope thereof.

For example, while the invention is applied to the D pillar 17 in the embodiments, the invention can be applied to the A pillar 14. In addition, in a sedan-type vehicle having no D pillar 17, the invention can be applied to the C pillar 16 which is positioned rearmost.

In addition, while the bulkhead 44b is formed integrally with the pillar garnish 44 in the embodiments, the bulkhead 44b can be constituted by a separate member from the pillar garnish 44.

According to the first aspect of the invention that has been described heretofore, since the space formed between the pillar and the pillar garnish is partitioned by the bulkhead provided on the pillar garnish to define the air bag accommodation chamber for accommodation of the air bag, the bulkhead is allowed to be interposed between the other members residing in the pillar garnish and the air bag, so that a damage to the air bag can be prevented in an ensured manner which would be caused by the interference of the air bag which is being inflated and the other members.

What is claimed is:

1. An occupant restraint system comprising:
    an air bag in a folded state being arranged in such a manner as to extend along a side portion of a roof and a pillar, the air bag being inflated with a gas generated by an inflator so as to be deployed in a curtain-like fashion along an inner surface of a side portion of a passenger compartment when a vehicle is involved in a collision; and
    a pillar garnish mounted on a side of a pillar which faces the passenger compartment, the pillar garnish having a bulkhead for partitioning a space formed between the pillar and the pillar garnish where an end portion of the bulkhead is apart from the pillar so as to define an air bag accommodation chamber for accommodation of the air bag,
    wherein an opening where the air bag is deployed is an end portion of the pillar garnish at the side the bulkhead side,
    wherein the pillar garnish has a mounting member for mounting the pillar garnish on the side of the pillar, the mounting member being disposed in a chamber defined by the bulkhead and different from the air bag accommodation chamber,
    wherein the pillar garnish has a first portion which bends at deployment of the airbag, and a second portion on which a mounting seat is formed, the mounting member is attached to the mounting seat, and the bulkhead is disposed at a location spaced apart from the mounting seat; and
    wherein the bulkhead protrudes more than the mounting member relative to the pillar garnish.

2. An occupant restraint system according to claim 1, wherein the bulkhead is formed on the second portion, and the first portion and the bulkhead define the air bag accommodation chamber.

3. An occupant restraint system according to claim 1, wherein the bulkhead is formed integrally with the pillar garnish.

4. An occupant restraint system according to claim 1, wherein the bulkhead is molded integrally with the pillar garnish.

5. An occupant restraint system according to claim 1, wherein said bulkhead is interposed between said air bag and said at least one mounting member.

6. An occupant restraint system according to claim 1, wherein the bulkhead is formed on the first portion, and the first portion and the bulkhead define the air bag accommodation chamber.

7. An occupant restraint system according to claim 1, wherein the pillar comprises a bracket which protrudes inward from the side of a pillar which faces the passenger compartment such that a side face of the bracket faces and confronts a side face of the bulkhead, said side face of the bulkhead being opposed to the airbag accommodation chamber, and
    wherein the bracket supports the mounting member.

8. An occupant restraint system comprising:
    an air bag in a folded state being arranged in such a manner as to extend along a side portion of a roof and a pillar, the air bag being inflated with a gas generated by an inflator so as to be deployed in a curtain-like fashion along an inner surface of a side portion of a passenger compartment when a vehicle is involved in a collision; and
    a pillar garnish mounted on a side of a pillar which faces the passenger compartment, the pillar garnish having a bulkhead for partitioning a space formed between the pillar and the pillar garnish where an end portion of the bulkhead is apart from the pillar so as to define an air bag accommodation chamber for accommodation of the air bag;
    wherein an opening where the air bag is deployed is an end portion of the pillar garnish at the side the bulkhead side;
    wherein the pillar garnish has a mounting member for mounting the pillar garnish on the side of the pillar, the mounting member being disposed in a chamber defined by the bulkhead and different from the air bag accommodation chamber;
    wherein the pillar garnish has a first portion which bends at deployment of the airbag, and a second portion on which a mounting seat is formed, the mounting member is attached to the mounting seat, and the bulkhead is disposed at a location spaced apart from the mounting seat; and
    wherein the bulkhead is formed on the first portion, and the first portion and the bulkhead define the air bag accommodation chamber.

9. An occupant restraint system comprising:
    an air bag in a folded state being arranged in such a manner as to extend along a side portion of a roof and a pillar, the air bag being inflated with a gas generated by an inflator so as to be deployed in a curtain-like fashion along an inner surface of a side portion of a passenger compartment when a vehicle is involved in a collision; and
    a pillar garnish mounted on a side of a pillar which faces the passenger compartment, the pillar garnish having a bulkhead for partitioning a space formed between the pillar and the pillar garnish where an end portion of the bulkhead is apart from the pillar so as to define an air bag accommodation chamber for accommodation of the air bag;
    wherein an opening where the air bag is deployed is an end portion of the pillar garnish at the side the bulkhead side;
    wherein the pillar garnish has a mounting member for mounting the pillar garnish on the side of the pillar, the mounting member being disposed in a chamber defined by the bulkhead and different from the air bag accommodation chamber;
    wherein the pillar garnish has a first portion which bends at deployment of the airbag, and a second portion on which a mounting seat is formed, the mounting member is attached to the mounting seat, and the bulkhead is disposed at a location spaced apart from the mounting seat;
    wherein the pillar comprises a bracket which protrudes inward from the side of a pillar which faces the passenger compartment such that a side face of the bracket faces and confronts a side face of the bulkhead, said side face of the bulkhead being opposed to the airbag accommodation chamber, and
    wherein the bracket supports the mounting member.

* * * * *